C. CARTER.
Molds for Making Medicinal Compressed Wafers, Pills, Lozenges, &c.
No. 206,536. Patented July 30, 1878.
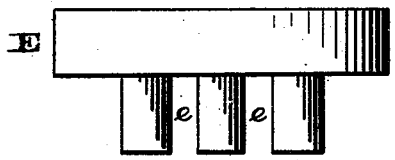
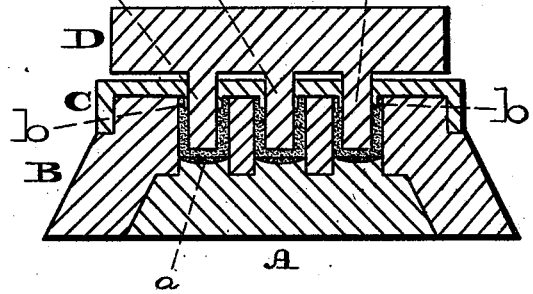
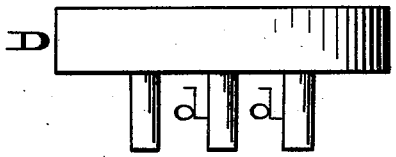
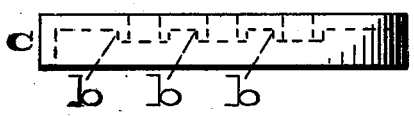
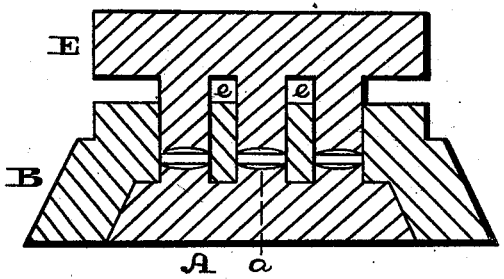
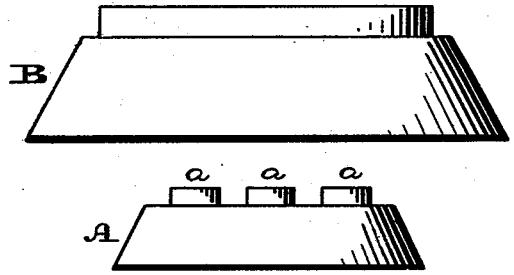
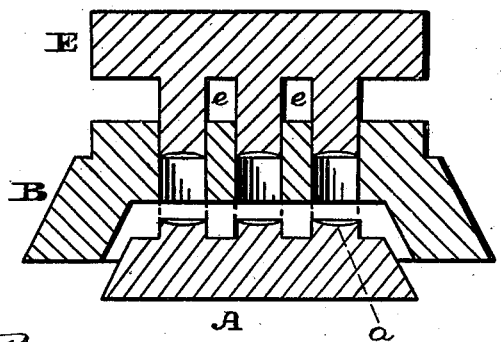
Witnesses:
Lewis F. Brous
A. P. Grant
Inventor:
Chas. Carter,
by John A. Diedersheim
ATTORNEY.

UNITED STATES PATENT OFFICE.

CHARLES CARTER, OF PHILADELPHIA, PENNSYLVANIA.

IMPROVEMENT IN MOLDS FOR MAKING MEDICINAL COMPRESSED WAFERS, PILLS, LOZENGES, &c.

Specification forming part of Letters Patent No. 206,536, dated July 30, 1878; application filed December 4, 1877.

*To all whom it may concern:*

Be it known that I, CHARLES CARTER, of the city and county of Philadelphia, and State of Pennsylvania, have invented a new and useful Improvement in Molds for Making Medicinal Compressed Wafers, Pills, Lozenges, &c., which improvement is fully set forth in the following specification and accompanying drawings, in which—

Figure 1 is a side view of the molds (separated) embodying my invention. Figs. 2, 3, and 4 are central sections thereof.

Similar letters of reference indicate corresponding parts in the several figures.

My invention has for its object the rapid production of medicinal compressed wafers, pills, and articles of similar nature, of any desirable shape and size, which, containing a proper dose or required amount of medicinal or other substance not pleasant to the taste, shall be made pleasant to the taste, the unpleasant taste being disguised.

My invention relates to an apparatus for forming and coating pills, wafers, and the like with saccharine or other suitable composition which will render them more palatable; and it consists in the construction and combination of certain devices with the mold, as will be hereinafter more fully set forth and claimed.

Referring to the drawings, A represents a bed-plate, which rests on a firm support or is attached to a pressure-machine, and it may be termed "the lower compression-plate." On the upper face of said plate there are several short projections, a, corresponding in number with that of the wafers, pills, lozenges, &c., to be made at one operation, and having their extremities, if desired, slightly concave. These projections may be cylindrical, oval, or other shape in cross-section, and they are adapted to fit snugly and enter to a sufficient extent corresponding openings in the flask-plate B, which is placed upon the bed-plate, the contiguous sides of the two plates being inclined or conical, if so desired, to facilitate the removal of the bed-plate, and the two plates may be fitted with a tongue and groove, to cause the proper disposition of the plates and prevent shifting thereof.

The openings or matrices in the flask-plate are of the exact depth required for the thickness of the wafers, pills, lozenges, &c., to be formed, and the surface of said plate is smooth, in order to allow the coating of the wafer or pill or the lozenge material to fill rapidly the molds in the flask-plate, and permit the superabundance of the said coating or material to be smoothed off and removed.

C represents a plate provided with a series of openings corresponding in number and shape with those of the plate B, but of smaller diameters. A downwardly-projecting rim, b, surrounds each perforation of the plate C, and it enters an opening or matrix of the flask-plate B, and into the same projects the pins d of a core-plate, D, which are guided by the openings and rims of the plate C, which plate D protects the edge of the coating or wafer or pill material from contact with the medicinal or other material when the mold is being filled with the same. Said plate D also serves for the rapid filling or introduction into the interior at one operation of several wafers of the medicinal or other substance. This guide-plate D may have but one opening where or when it is desirable or convenient to make but a single wafer, &c.

The core-plate D may have the extremities of its pins slightly rounded, if desired, and said pins correspond in number and shape with the openings of the guide-plate C, and of slightly less diameter, so as to enter the same, and consequently by pressure to penetrate beyond them, in such manner that when removed they make and leave in the plate B a suitable depression, cavity, or mold in the coating or wafer or pill material of required depth for reception of a proper amount or dose of the medicinal or other substance, and produce the wafer or pill of three sides and of suitable thickness. The same plate is also employed for pressing the medicinal or other substance after it is placed in the mold or cavity of the plate B, and it may have but a single pin where and when it is required to make but one wafer, &c.

E represents the upper compression plate or plunger, and it has a series of pins, e, which may be slightly concave at their extremities, said pins being of the same shape as the perforations of the plate B, and of slightly less diameter, so as to snugly enter said perforations, and they are of sufficient length to enable the required pressure to be made upon and to discharge the contents of the plate B. This plate E may be attached to any form of lever or press, or, when it is desired to make one or a small number of wafers, pills, lozenges, &c., at one operation, forcible compression by blows may be employed.

These several plates are detachable one from the other, and they will be constructed of steel or other hard metal capable of receiving and withstanding the required amount of compressing force essential for the purposes intended, and guide-pins or other devices may be employed and properly applied in order for the accurate adjustment of the plates one with another.

The operation is as follows: The mold or flask-plate B is adjusted to lower compression or bed-plate A, and all the matrices properly filled with the wafer or pill coating which is agreeable to the taste, and in condition of suitable powder and moisture or mass, which filling is readily accomplished by throwing over the material and then rapidly removing the excess by a smooth-edged instrument or spatula. The plate C is then adjusted so that its perforations will register with those of the plate B, and the small rims or flanges project into the coating material to protect its margin from contact with the medicinal or other substance not agreeable to the taste, and from spreading on the surface of the plate B. The core-plate D is then introduced by its pins or projections into the perforations of the guide-plate C, and with suitable pressure each core-pin causes a mold, depression, or cavity of size and shape and depth of the penetrating mold-pin in the coating material contained in the molds of the plate B. This core-plate is now removed and the mold or cavity, as formed, is then filled with the medicinal or other substance, properly moistened, in the condition of powder or mass, and employed alone or mixed with any inert ingredient to regulate the dose, so that the contents of each mold may contain the proper dose required of the substance to be coated with it introduced into the wafer, &c.

The filling may be rapidly accomplished in the same manner as described in connection with the flask-plate B. The plate D is then returned, and the proper or sufficient amount of pressure employed to force down the contents to lower margin of the flange or rim of the plate C. Plates C and D are then removed, and the slight cavity remaining at the upper part of medicine is filled with the coating material, thus completely surrounding the medicinal or other substance with the coating material, and of suitable thickness. The upper pressure-plate E is then applied and adjusted, and sufficient pressure employed to compress the contents of the mold into proper form, size, and solidity, and produce an article which, from its agreeable taste, may be easily swallowed. The lower compression-plate is then removed and pressure again applied, and continued till the perfected wafers, &c., with the inclosed medicinal or other substance, is discharged beneath the plate B.

This operation may be applied to the simultaneous manufacture of many medicinal wafers, &c., or it may be modified to make but a single article. Where lozenges are to be made, the operation is precisely the same, except that the second mold-plate or cavity-mold is dispensed with.

Having thus described my invention, what I claim as new, and desire to secure by Letters Patent, is—

In an apparatus for molding and coating pills, wafers, and the like, the combination, with a core-plate having pins d, and a flask with matrices in which the pills or wafers are both molded and coated, of the perforated plate C, applied to the flask and formed with short tubular flanges b upon its under side, the said flanges being around the perforations of the plate and projecting into the matrices of the flask, substantially as herein shown and described, and for the purposes specified.

CHARLES CARTER.

Witnesses:
 JOHN A. WIEDERSHEIM,
 SAML. M. GRICE.